United States Patent
Kim

(10) Patent No.: US 12,098,925 B2
(45) Date of Patent: Sep. 24, 2024

(54) LONGITUDINAL-LIMITED LANE MARKING LOCALIZER

(71) Applicant: GM Cruise Holdings LLC, San Francisco, CA (US)

(72) Inventor: Hyungjin Kim, Campbell, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 325 days.

(21) Appl. No.: 17/556,048

(22) Filed: Dec. 20, 2021

(65) Prior Publication Data

US 2023/0194268 A1    Jun. 22, 2023

(51) Int. Cl.
| | |
|---|---|
| *G01C 21/30* | (2006.01) |
| *B60W 60/00* | (2020.01) |
| *G01S 7/48* | (2006.01) |
| *G01S 17/89* | (2020.01) |
| *G06F 16/29* | (2019.01) |

(52) U.S. Cl.
CPC ........... *G01C 21/30* (2013.01); *B60W 60/001* (2020.02); *G01S 7/4802* (2013.01); *G01S 17/89* (2013.01); *G06F 16/29* (2019.01); *B60W 2420/408* (2024.01); *B60W 2552/53* (2020.02)

(58) Field of Classification Search
CPC .... G01C 21/30; G06F 16/29; B60W 2552/53; B60W 60/001; B60W 2420/408; G01S 7/4802; G01S 17/89
USPC ......................................................... 701/25
See application file for complete search history.

(56) References Cited

U.S. PATENT DOCUMENTS

| | | | |
|---|---|---|---|
| 9,384,394 B2 * | 7/2016 | Joshi ................. G01C 21/3819 |
| 10,739,459 B1 * | 8/2020 | Castorena Martinez ................... G01S 17/89 |
| 10,999,719 B1 * | 5/2021 | Kaplan .................... G06F 16/29 |
| 11,035,933 B2 * | 6/2021 | Demir .................. G05D 1/0088 |
| 11,169,526 B2 * | 11/2021 | Yanagihara .......... G06V 20/588 |
| 11,507,775 B2 * | 11/2022 | Viswanathan .......... G06F 18/22 |
| 11,772,669 B2 * | 10/2023 | Ravichandran ..... B60W 60/007 701/24 |
| 11,834,065 B2 * | 12/2023 | Westman .............. G01S 7/4802 |
| 11,851,085 B2 * | 12/2023 | Eldar ................ G01C 21/3658 |
| 2021/0304433 A1 * | 9/2021 | Huang .................. G01S 19/393 |
| 2022/0268598 A1 * | 8/2022 | Mori .................. G01C 21/3841 |
| 2022/0371585 A1 * | 11/2022 | Rumler .................... G01S 19/42 |
| 2023/0177847 A1 * | 6/2023 | Mei ..................... G01C 21/3826 382/104 |

* cited by examiner

*Primary Examiner* — Andrew Joseph Rudy

(57) ABSTRACT

System, methods, and computer-readable media for localizing an autonomous vehicle to a location in a stored LIDAR map relative to lane markings labeled in the stored LIDAR map. The labeled lane marking may be associated with a dashed line, a solid line, a double line, or an unmarked line. The autonomous vehicle may fit the set of lane marking points with the labeled lane marking via a point-to-line solver that locates the set of lane marking points to the line, excluding a longitudinal variable. The lane matching localizing system utilities a point-to-line iterative closet point, wherein the matched point pairs are calculated by perpendicular point of line from the query point instead of finding the closest sampled point.

20 Claims, 6 Drawing Sheets

LONGITUDINAL-LIMITED LANE MARKING LOCALIZER

TECHNICAL FIELD

The subject technology pertains to localizing an autonomous vehicle with respect to lane markings by minimizing a longitudinal variable in a point-to-line fitting method.

BACKGROUND

An autonomous vehicle is a motorized vehicle that can navigate without a human driver. An exemplary autonomous vehicle includes a plurality of sensor systems, such as, but not limited to, a camera sensor system, a Lighting Detection and Ranging (LIDAR) sensor system, a radio detection and ranging (Radar) sensor system, amongst others, wherein the autonomous vehicle operates based upon sensor signals output by the sensor systems. Specifically, the sensor signals are provided to an internal computing system in communication with the plurality of sensor systems, wherein a processor executes instructions based upon the sensor signals to control a mechanical system of the autonomous vehicle, such as a vehicle propulsion system, a braking system, and/or a steering system.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
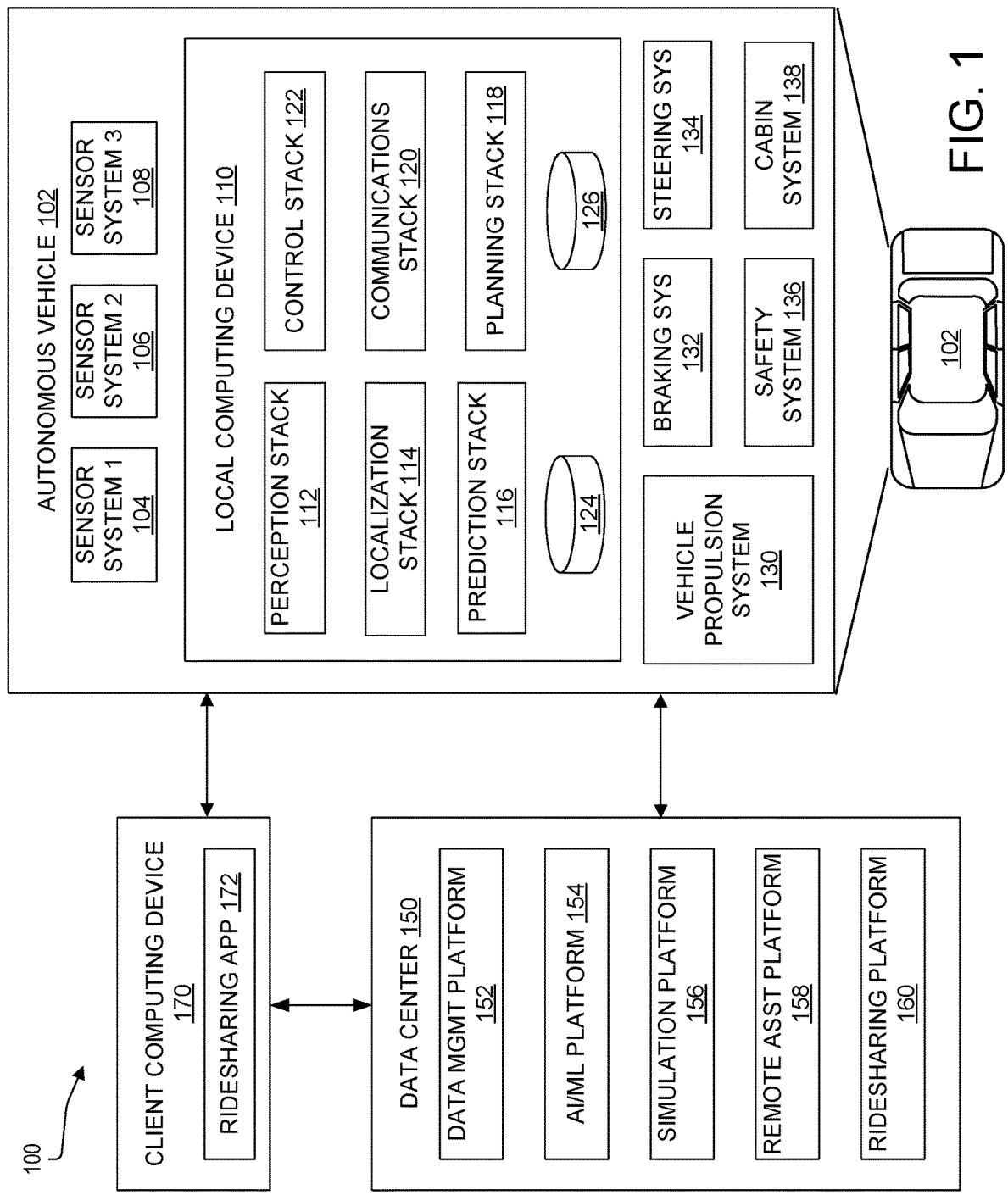
FIG. 1 shows an example embodiment of an autonomous vehicle system and supporting devices, in accordance with some aspects of the present technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Many autonomous vehicles make decisions based on localization models that determine where an autonomous vehicle is with respect to surrounding objects. In some aspects, localization is performed using sensors to identify road features, such as road lane markings, and localization of the autonomous vehicle is relative to the road features.

The disclosed technology addresses the need in the art for a localization technique to match sensor data representing lane markers to lane markers on an authoritative map stored by an autonomous vehicle. Localization is critical for the autonomous vehicle (AV) because the authoritative map includes semantic information that helps the AV understand valid possible trajectories from locations on the road, among other semantic information that the AV uses to understand the road segment and traffic signals. Therefore, the AV needs to locate itself on the authoritative map accurately such that the AV can accurately maneuver in its environment.

Localization of the AV to the authoritative map may be so important that the AV may perform multiple localization methods and use the one that provides the best output for a given road situation. For example, localization stacks may use a three-dimensional (3D) generalized iterative closest point (GICP) algorithm and an intensity scan matcher algorithm to localize the AV to the authoritative map and use a high-fidelity localization (HFL) algorithm to evaluate all of the localization results to find the best one. In some embodiments, the best localization result can be one that has the best covariance, which is a proxy for confidence in the quality of the localization algorithms outputs.

Generally, localization of the AV with respect to lane line features are performed by matching LIDAR point cloud data to lane markers that may be dashed, solid, double, or unmarked. Localization to a lane line feature can be performed using point-to-point iterative closet point (ICP), or GICP, but the methods struggle to make suitable and consistent matches because line information usually has ambiguity in the longitudinal direction because it is painted longitudinally. 3D GICP could benefit from improvement in featureless or feature-poor environments, such as environments where only lane-line features are present.

ICP algorithms can perform poorly because the LIDAR output is a collection of points that need to be matched to a solid line on the authoritative map. Note that even a dashed line can be represented as a solid line on the authoritative map. The solid line on the authoritative map can include a semantic label indicating that the line is dashed, and therefore can be crossed. When trying to localize a point to a line (or a point to a point on a line), the ICP algorithms tend to cause the localization of points to have a bit of jitter (the localization of the AV jumps forward and backward). This may be difficult for downstream consumers or localization since it implies unusual vehicle kinematics. This jitter can be compensated for through smoothing, but a better solution is an improved localization method.

The present technology provides improvements to point-to-line localization. In some embodiments, the present technology includes a lane matching localizing system that utilizes an improved point-to-line ICP. Rather than finding the closest point on a line and accounting for the longitudinal and lateral dimensions, the matched point pairs are calculated by matching to a perpendicular point on the line from the query point instead of finding the closest sampled point. In some aspects, this can be achieved by minimizing the influence of a longitudinal variable in the ICP algorithm.

The present technology can be used in addition to existing localization methods. For example, the present technology minimizes or eliminates the influence of a longitudinal variable in an ICP method and can be used in combination with other methods that are better at longitudinal localization, such as GICP or the intensity scan matcher. One advantage of using such a lane matching localizing system is that it may provide more reliable lateral localization in line-based environments, such as freeway or multiple line roads, which usually do not have many surrounding structures.

The lane matching localization techniques of the present technology solve at least these problems and provide other benefits, as will be apparent from the figures and description provided herein.

FIG. 1 illustrates an example of an AV management system 100. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include different types of sensors and can be arranged about the AV 102. For instance, the sensor systems 104-108 can comprise Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other embodiments may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some embodiments, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can additionally include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can also identify environmental uncertainties, such as where to look for moving objects, flag areas that may be obscured or blocked from view, and so forth. In some embodiments, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 114 can determine the AV's position and orientation (pose) using different methods from multiple systems (e.g., GPS, IMUs, cameras, LIDAR, RADAR, ultrasonic sensors, the HD geospatial database 126, etc.). For example, in some embodiments, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some embodiments, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps (e.g., the authoritative map) and related data of the streets upon which the AV 102 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some embodiments, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridesharing platform 160, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structured (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from a cartography platform; modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system, including a server, desktop computer, laptop, tablet, smartphone, smart wearable device (e.g., smartwatch, smart eyeglasses or other Head-Mounted Display (HMD), smart ear pods, or other smart in-ear, on-ear, or over-ear device, etc.), gaming system, or other general purpose computing device for accessing the ridesharing application 172. The client computing device 170 can be a customer's mobile computing device or a computing device integrated with the AV 102 (e.g., the local computing device 110). The ridesharing platform 160 can receive requests to pick up or drop off from the ridesharing application 172 and dispatch the AV 102 for the trip.

Figure 2:
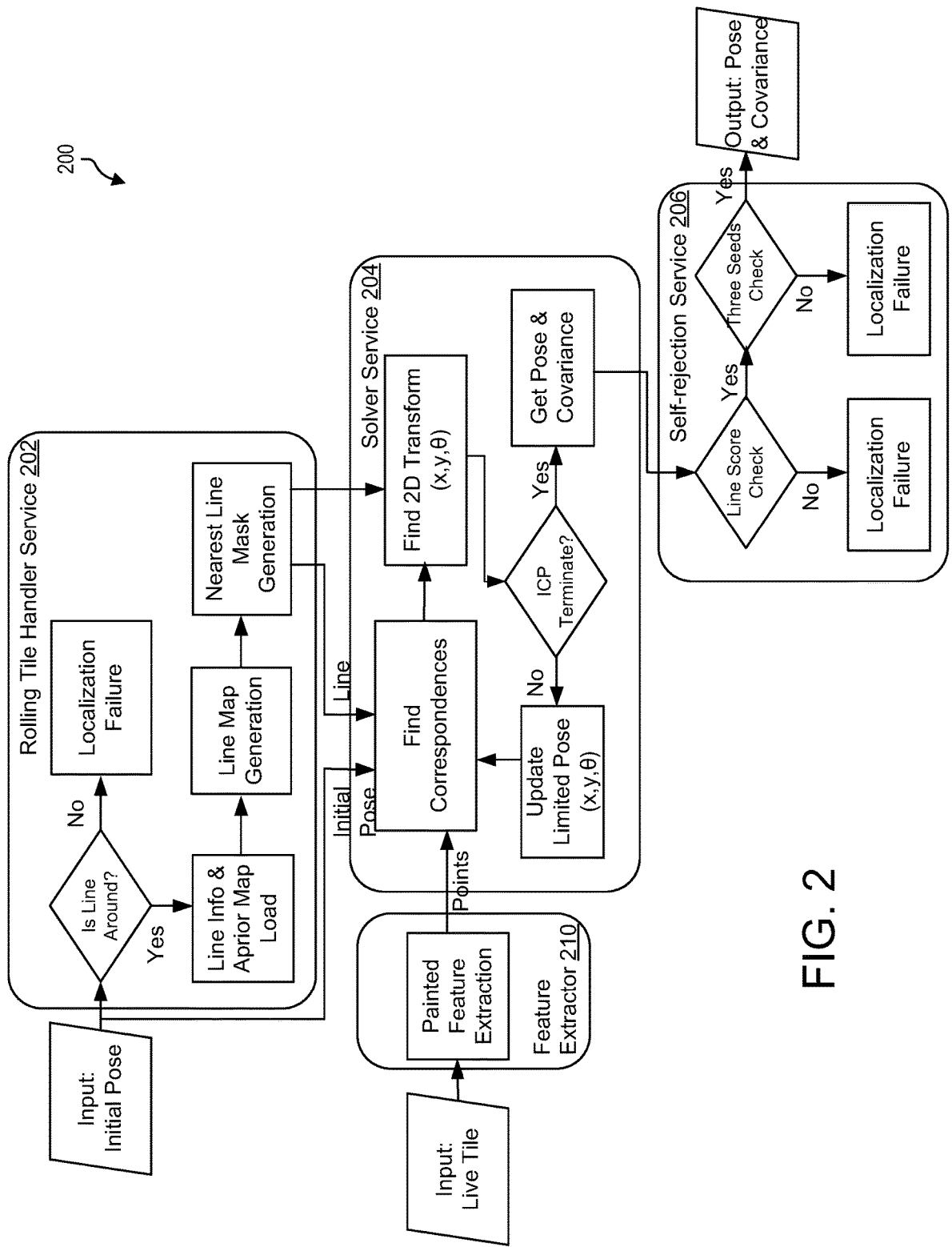
FIG. 2 illustrates an example workflow of a lane matching localizing system, in accordance with some aspects of the present technology.

FIG. 2 illustrates an example workflow of a lane matching localizing system (LML) 200, in accordance with some aspects of the present technology. The workflow illustrates that a rolling tile handler service 202 receives an initial pose as an input and loads map data for localization, containing all line information around the AV 102 and the feature extractor estimates painted points on a live tile on which the AV is located. A solver service 204 calculates a 2D-transformed pose from feature points and their corresponding lines from the map using point-to-line 2D ICP. Then, a self-rejection service 206 determines localization success and returns an invalid or unavailable status if a particular criterion is met.

The rolling tile handler service 202 is configured to load map portions (tile) from the geospatial database 126 that includes areas around the AV 102. Semantic data, including lane and line labeled information, and an authoritative map containing intensity data and semantic values (e.g., crosswalks, drivable area, intersections, etc.) may be provided. To effectively load data for map portions containing areas around the AV 102 as it moves, a rolling tile scheme may be applied.

Figure 3:
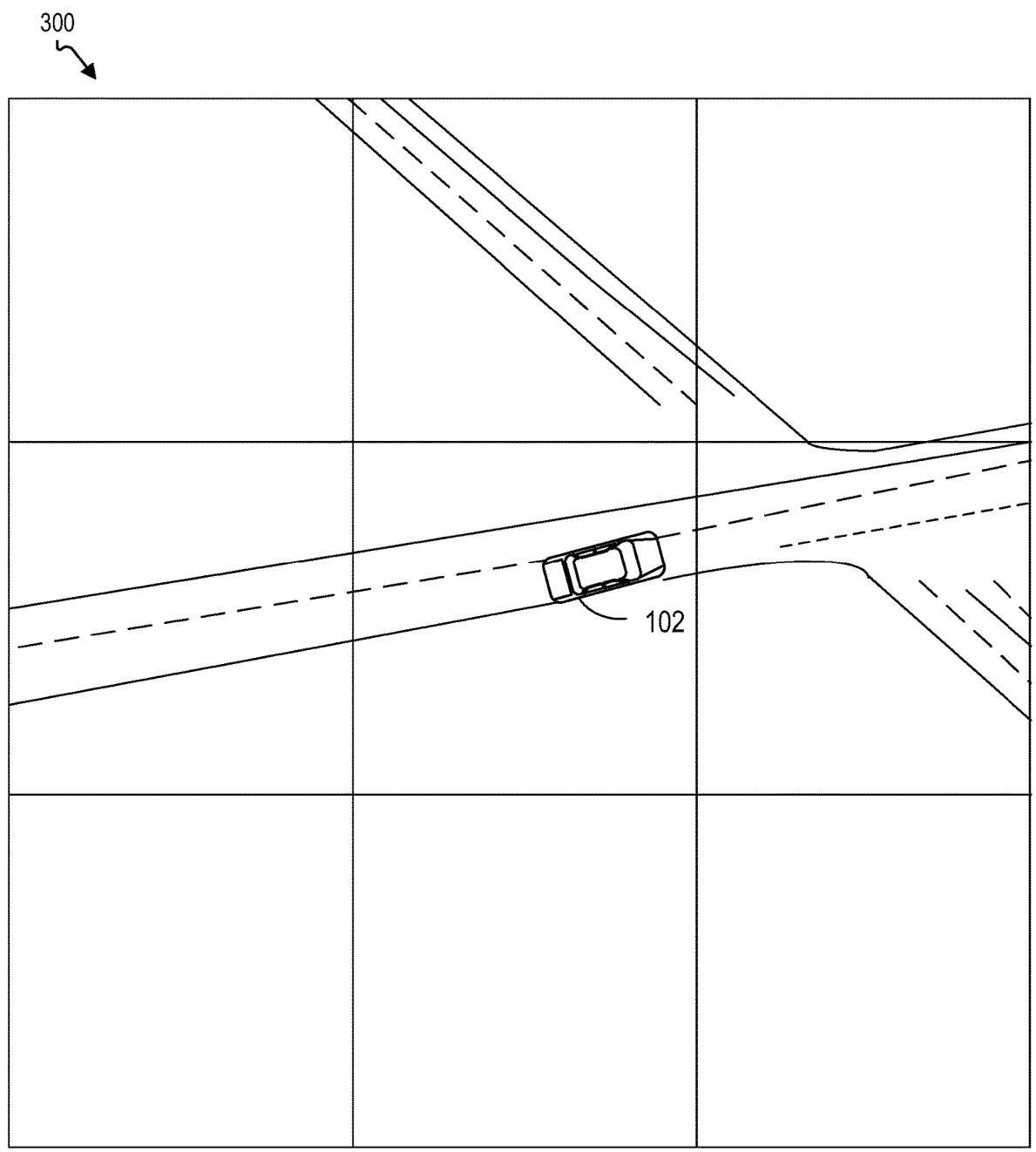
FIG. 3 illustrates an example rolling tile scheme, in accordance with some aspects of the present technology.

FIG. 3 illustrates an example rolling tile scheme. The rolling tiles consist of or otherwise include nine tiles (3×3) around the AV 102. The size of tiles may be fixed, and the AV 102 may continually be located in a center tile. Once the AV 102 moves to another tile from the center tile, the other tile is re-allocated as the center tile, and the new tiles around the center one are loaded, forming a rolling tile map. Each tile contains lines and other subordinate information. Line points (start and endpoints) and type of line are obtained from a semantic data class for line information. The line types consist of or otherwise include solid, double, dashed, and unmarked. Since this localizer only considers visible lines, the unmarked type of line is ignored. Line feature points are primarily with respect to orienting lines for driving, as opposed to crosswalks, intersections, and bus stops. Thus, the tile masks can be generated to remove features such as crosswalks, intersections, and bus stops from the map prior to the lane line localization.

Referring back to FIG. 2, the painted feature extractor 210 extracts painted features from the live tile. The live tile is created from data collected from the AV sensors, such as a LIDAR sensor. A first step may include the extraction of painted feature points, including lines, road markers, and any painting in the road. An adaptive threshold method may be applied to extract high values of intensity data in the live tile. The intensity values vary depending on conditions and environments, so an adaptive threshold filter is applied instead of a typical threshold filter.

Once a line map from the rolling tile handler and line feature points from the live tile has been obtained, the localization problem can be solved by the solver service 204. Lane localization estimation may be based on the pose by 2D iterative closest point (ICP) matching with query points and sampled points from the line map. However, while line information usually has strong constraints in the lateral direction, there are ambiguities in the longitudinal direction. Therefore, utilizing a point-to-line ICP algorithm is a superior alternative since point-to-line constraints are weak in the longitudinal direction. Thus, a limited pose is updated, only updating lateral and yaw, during iterative steps of ICP. Moreover, this technique operates the ICP algorithm twice to get robust results.

Input: $L=\{l_i\}$: line map
$A=\{a_i\}$: query points
$T_0$: initial transform
Output: T: final transformation
(1) $T=T_0$
(2) $\hat{A}=T \cdot A$
(3) while not converged do
(4) for i=0 to N do
(5) l=FindNearestLine($\hat{a}_i$)
(6) $m_i$=GetPerpendicular(l, $\hat{a}_i$)
(7) $\eta_i \in 1$ or 0=Active(l, $\hat{a}_i$)
(8) end
(9) $\Delta T = \text{argmin} \|\eta_i \cdot (a_i, m_i)\|^2$
(10) $\Delta[x, y, \theta] = T^{-1} \cdot \Delta T \cdot T$
(11) $\Delta T' = T \cdot \Delta[0, y, \theta] \cdot T^{-1}$
(12) $\hat{A} = \Delta T' \cdot \hat{A}$
(13) end The above Algorithm shows the proposed solver of the present technology. The basic structure follows a 2D ICP algorithm. A summarization of the above algorithm is that the algorithm takes a set of input points, finds a line to try to map the points to, and finds a perpendicular direction from the line. Thereafter the map coordinates are transformed to coordinates as viewed by the AV and an ICP algorithm is performed to match the points to the line without using the y variable. This process is repeated until the query points are matched to the line.

In more detail, the above algorithm finds the corresponding point by picking a perpendicular point on the nearest line instead of searching a closest point (as shown in in line 6 of the above code). In line 7 of the above code, η denotes the active of correspondence, which is set to 1 or 0.

The ICP algorithm can be performed twice by changing the active set (the line to which localization is being performed) in line 7. The line filtering algorithm offers reliable line features, but sometimes line features are not detected. This problem can make the success rate of localization low. Thus, the first attempt with the ICP algorithm may be operated with only line features from filtering without any distance rejections. Then, a second attempt with the ICP algorithm may be performed with all features with a distance rejection based on the line type. Since single and double lines have different line widths, the distance for rejection is changed based on the line type.

Once finding correspondences of query points, 2D transformation between the correspondences are solved by using singular value decomposition (SVD) in line 9 of the above code. The coordinate frame of ΔT in line 9 of the above code is at the global frame (map overhead view) and is transformed into the local frame (Chassis frame from the point of view of the AV) as shown in line 10 of the above code. As mentioned, point-to-line constraints have many ambiguities in the longitudinal direction. Thus, the solver can minimize or eliminate the longitudinal value, for example, by setting x to 0 in line 11 above.

One criterion for localization is the issue of false-positive cases due to the limitation of sensor measurements and correction. The self-rejection service 206 can compensate for this issue by rejecting false positives and improving localization quality. The key points for self-rejections are to remove false positives without removing true positives. There may be two types of self-rejection modes, a line scoring mode, and a three seeds agreements mode.

The line scoring mode/algorithm for self-rejection may calculate the percentage of measurement matched lines relative to total lines. The total line distance is calculated by summing lines from the semantic map. Even though the line from the semantic map has detailed information such as solid, dashed, and double, the lines indicated in the semantic map do not necessarily match the LIDAR point returns because the semantic map includes a drawn line that does not show places where lines may be faded or where dashes occur. The line information in the semantic map only provides information indicating that the line is dashed and doesn't provide a start and endpoint of each dash in the dashed line. Thus, the extracted feature points from the intensity map can be utilized to get more accurate line information.

Since calculating the distance has limitations, coverage can be used to calculate a matched percentage of lines. The coverage may be from a combination of a rectangle and an ellipse to result in a matched percentage in addition to the matched line distance and the total line distance. Self-rejection conditions may include when a matched percentage is less than a threshold or the matched distance is less than the threshold.

In some embodiments, three seed poses are utilized by the ICP algorithm to attempt to gain confidence in the output of the ICP algorithm. Three seeds are generated from the initial pose: a center seed from the initial pose, a left seed from the left side of the initial pose, and a right seed from the right side of the initial pose. The ICP solves the localization results based on the three seed poses. Even though the locations of the seeds are different, the localization results should be similar. Thus, the agreement of three seeds is a criterion of self-rejection. If the final result is in boundary, the three seeds agreement is used. However, if the result is too left or right, then only two seeds are compared because the initial location of the other seed is too far to return the correct result.

The LML 200 has three main self-rejections and an additional rejected condition as defined in Table 1.

TABLE 1

| localization criteria conditions | |
|---|---|
| FAIL_BY_ICP | ICP failure cases from 2D ICP solver: |
| | FAIL_FEW_CORRES |
| | Failure as fewer correspondences during iteration step |
| | FAIL_FEW_SOURCE_POINTS |
| | Failure as fewer input source points |
| | FAIL_EXCEED_MAX_RESIDUAL_ERROR |
| | Failure case from high residual error |
| FAIL_BY_LINE_SCORING | Self-rejections from line scoring: |
| | FAIL_NO_POINTS_IN_BACK |
| | Nothing matching point behind vehicle |
| | FAIL_BOTH_LINES_DISAGREEMENT |
| | Failure from both line agreements (left and right lines) |
| | FAIL_LEFT_LINE_DISAGREEMENT |
| | Failure from left line agreement |
| | FAIL_RIGHT_LINE_DISAGREEMENT |
| | Failure from right line agreement |
| | FAIL_BOTH_LINES_UNAVAILABLE |
| | Failure from unavailability of both lines |
| FAIL_BY_THREE_SEEDS | Self-rejections from three seed agreements method. |
| | FAIL_EXCEED_COVERAGE |

TABLE 1-continued localization criteria conditions

| | |
|---|---|
| | Failure case to exceed the coverage of solver |
| | FAIL_SEEDS_DISAGREEMENTS |
| | Failure case from seeds disagreements |
| | FAIL_SEEDS_SCORING |
| | the score of out-boundary seed is higher than center seed |
| FAIL_BY_TURNING | If the vehicle is curving on the road, LML is not operated. |

The self-rejection criteria referenced above can be used to reject the outcome of the ICP algorithm of the present technology since these self-rejections indicate that the ICP algorithm probably has not provided a sufficiently reliable localization.

Even when the localization provided by the ICP algorithm of the present technology clears the self-rejections, the localization still might not be used. It should be compared with the other localization methods utilized by the AV. One way to compare the various localization methods is through a covariance calculation performed on the outcome of each method.

Since the LML 200 has a special solver that minimizes or eliminates a longitudinal variable from other ICP methods, its covariance is must also minimize or eliminate the longitudinal variable. The covariance value is calculated from the normal vectors of lines and points in the local frame. Then, it is transformed into a global frame without longitudinal value. Solving for the covariance of the generated fitting output may represent an error of the localization of the autonomous vehicle to the location illustrated in the stored LIDAR map. The solved two-by-two covariance matrix may then be transformed into a three-by-three global matrix that includes a longitudinal element, a latitudinal element, and a yaw element.

The covariance can be a proxy for a confidence value in the output of the LML 200. Likewise, a covariance output by the other localization methods is also a confidence in their outputs. The method associated with the best (lowest) covariance can be considered the method that has performed best and should be chosen to localize the AV to the map.

Figure 4:
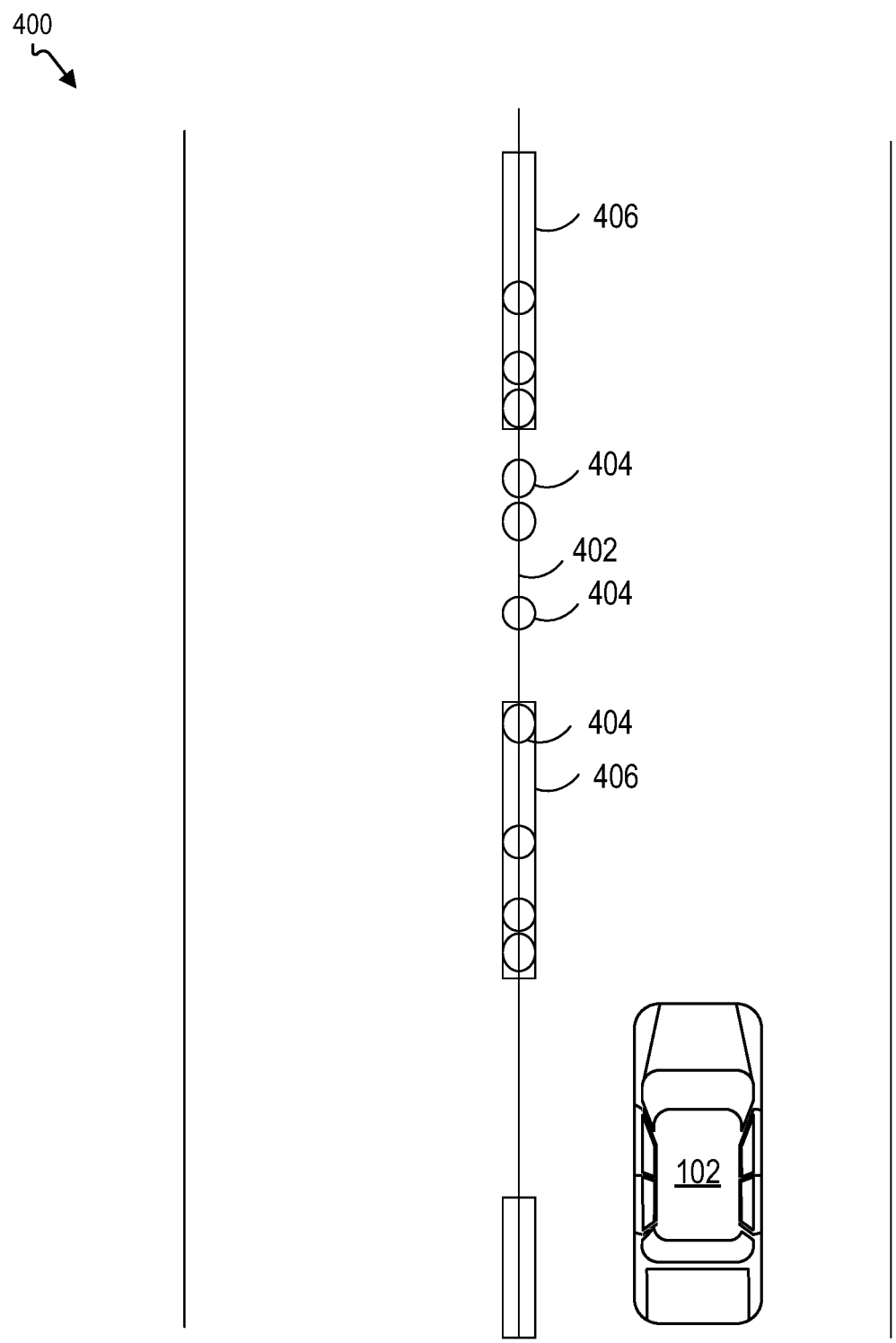
FIG. 4 illustrates an example environment in which the autonomous vehicle uses an improved localization technique using lane markers, in accordance with some aspects of the present technology.

FIG. 4 illustrates an example environment in which the AV 102 uses an improved localization technique using lane markers. A set of lane marking points 404 may be detected by the AV 102, and a labeled lane marking 402 may be loaded based on a stored map, such as a stored LIDAR map. The labeled lane marking 402 may be associated with a painted dashed lane 406. The AV 102 may fit the set of lane marking points 404 with the labeled lane marking 402 via a point-to-line solver that locates the lane marking points to the line, minimizing a longitudinal variable. The minimized longitudinal variable may be set to zero such that the point-to-line solver locates the set of lane marking points to the line without a minimized longitudinal variable. In addition, the point-to-line solver may locate the set of lane marking points to the line based on a latitudinal variable and a pose variable. The AV 102 may be localized to the location on the stored LIDAR map based on the fitting by the point-to-line solver.

Figure 5:
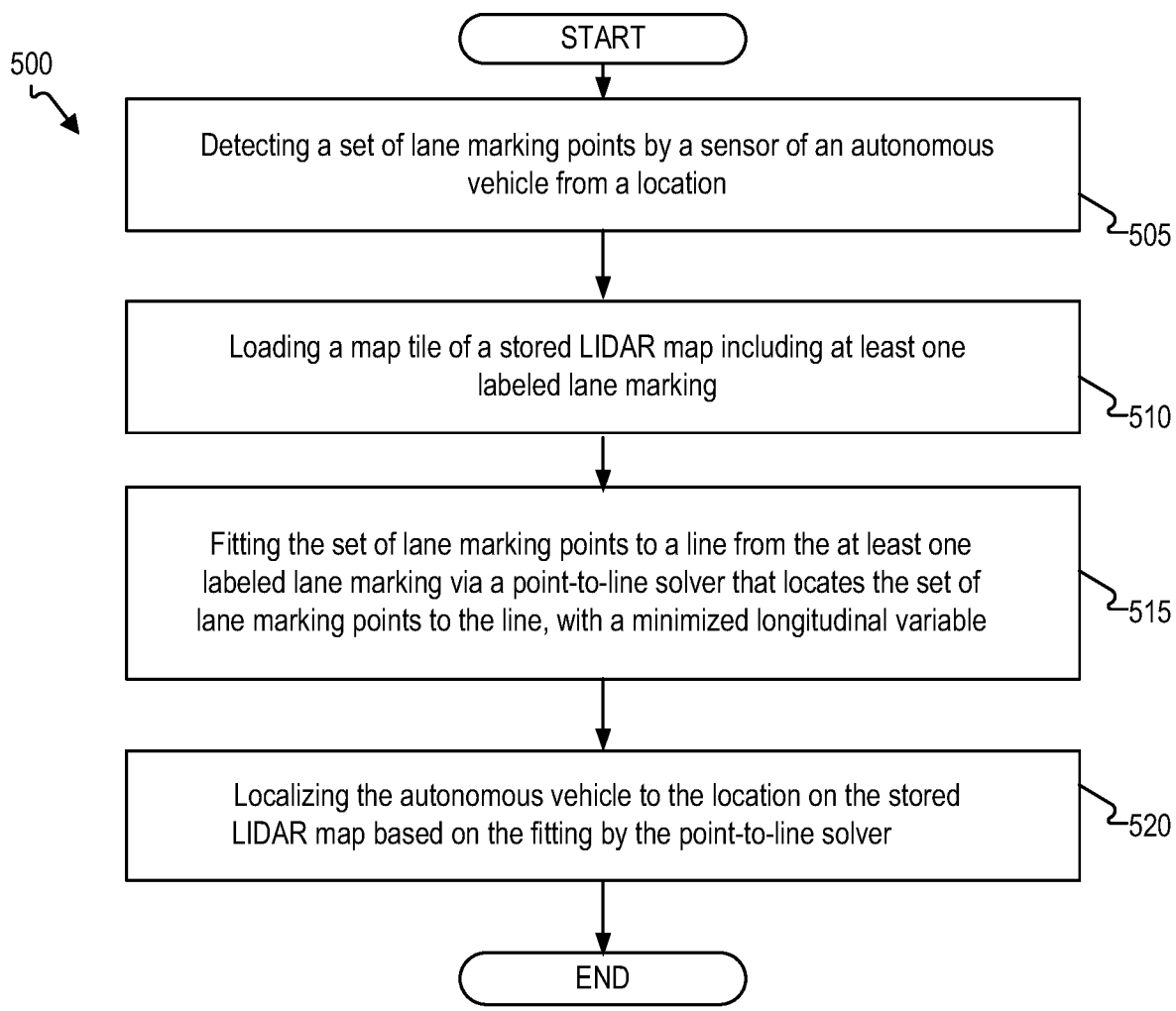
FIG. 5 illustrates an example method for localizing an autonomous vehicle to a location in a stored LIDAR map relative to lane markings labeled in the stored LIDAR map, in accordance with some aspects of the present technology.

FIG. 5 illustrates an example method 500 for localizing an autonomous vehicle to a location in a stored LIDAR map relative to lane markings labeled in the stored LIDAR map. Although the example method 500 depicts a particular sequence of operations, the sequence may be altered without departing from the scope of the present disclosure. For example, some of the operations depicted may be performed in parallel or in a different sequence that does not materially affect the function of the method 500. In other examples, different components of an example device or system that implements the method 500 may perform functions at substantially the same time or in a specific sequence.

According to some aspects, the method 500 may commence at step 505 with a set of sensors of an autonomous vehicle detecting a set of lane marking points on a road or other surface being traversed by while the autonomous vehicle is at a location on the road/surface. For example, the sensor system 104, the sensor system 106, and/or the sensor system 108 illustrated in FIG. 1 may detect a set of lane mark points by a sensor of an autonomous vehicle from a location. Multi-sensor point cloud data may be created based on a set of LIDAR sensors, RADAR sensors, images from a camera, or a combination thereof.

According to some aspects, the method 500 includes loading a map tile of a stored LIDAR map, including at least one labeled lane marking at step 510. For example, the mapping and localization stack 114 illustrated in FIG. 1 may load a map tile of the stored LIDAR map, including one labeled lane marking. The labeled lane markings may be previously labeled based on stored intensity maps, for example.

According to some aspects, the method 500 includes fitting the set of lane marking points (detected at step 505) to a line from the at least one labeled lane marking (loaded at step 510) via a point-to-line solver that locates the set of lane marking points to the line, with a minimized longitudinal variable at step 515. For example, the mapping and localization stack 114 illustrated in FIG. 1 may fit the set of lane mark points to a line from the at least one labeled lane marking via a point-to-line solver that locates the set of lane mark points to the line, minimizing a longitudinal variable. For example, the point-to-line solver can utilize the latitudinal variable and the pose variable. The longitudinal variable corresponds to a longitudinal transformation of a source point to a target point in the line when fitting the source point to the line. The latitudinal variable corresponds to a latitudinal transformation of the source point to the target point in the line when fitting the source point to the line. The pose variable corresponds to a rotational angle or yaw of the source point to the target point in the line when fitting the source point to the line. According to some aspects, the method 500 includes localizing the AV 102 to the location on the stored LIDAR map based on the fitting by the point-to-line solver at step 520. For example, the mapping and localization stack 114 illustrated in FIG. 1 may localize the AV 102 to the location on the stored LIDAR map based on the fitting by the point-to-line solver.

In some aspects, the lane marking labeled in the stored LIDAR map is a dashed lane boundary, represented in the stored LIDAR map as a solid line with a label indicating that the lane boundary is a dashed line. In some aspects, the lane marking labeled in the stored LIDAR map is a solid lane boundary, represented in the stored LIDAR map as a solid line with a label indicating that the lane boundary is a solid line. In some aspects, the lane marking labeled in the stored LIDAR map is a double lane boundary, represented in the stored LIDAR map as a solid line with a label indicating that the lane boundary is a double line. In some aspects, the lane marking labeled in the stored LIDAR map is an unmarked lane boundary, represented in the stored LIDAR map as a solid line with a label indicating that the lane boundary is unmarked.

In some aspects, the minimized longitudinal variable is a weak and negligible constant. In some aspects, the minimized longitudinal variable is set to zero. In some aspects, the point-to-line solver utilizes variables consisting essentially of a rotational (pose) variable and a latitudinal translation variable for each point. In some aspects, loading the map tile of the stored LIDAR map further comprises loading a first map tile of the stored LIDAR map for a section of the stored LIDAR map behind the autonomous vehicle.

For example, the mapping and localization stack 114 illustrated in FIG. 1 may load a first map tile of the stored LIDAR map for a section of the stored LIDAR map behind the autonomous vehicle. According to some aspects, the method includes loading a second map tile of the stored LIDAR map for a section of the stored LIDAR map on which the autonomous vehicle is located. For example, the mapping and localization stack 114 illustrated in FIG. 1 may load a second map tile of the stored LIDAR map for a section of the stored LIDAR map on which the autonomous vehicle is located. According to some aspects, the method includes loading a third map tile of the stored LIDAR map for a section of the stored LIDAR map in front of the autonomous vehicle. For example, the mapping and localization stack 114 illustrated in FIG. 1 may load a third map tile of the stored LIDAR map for a section of the stored LIDAR map in front of the autonomous vehicle.

According to some aspects, the method includes generating a rolling map from the first map tile, the second map tile, and the third map tile. For example, the mapping and localization stack 114 illustrated in FIG. 1 may generate a rolling map from the first map tile, the second map tile, and the third map tile. In some aspects, the rolling map is dynamic whereby the second map tile replaces the first map tile, and the second map tile is replaced by the third map tile, and a new map tile is added in place of the third map tile as the autonomous vehicle progresses forward. In some aspects, the rolling map is dynamic whereby the second map tile replaces the first map tile, and the third map tile replaces the second map tile, and a new map tile is added in place of the third map tile as the autonomous vehicle progresses forward.

According to some aspects, the method includes determining whether the stored LIDAR map includes at least one visible lane marking near the autonomous vehicle. For example, the mapping and localization stack 114 illustrated in FIG. 1 may determine whether the stored LIDAR map includes at least one visible lane mark near the autonomous vehicle.

According to some aspects, the method includes failing the method for localizing the autonomous vehicle to a location in a stored LIDAR map when the lane boundary is an unmarked lane boundary. For example, the mapping and localization stack 114 illustrated in FIG. 1 may fail the method for localizing the autonomous vehicle to a location in a stored LIDAR map when the lane boundary is an unmarked lane boundary.

In some aspects, the map tile of the stored LIDAR map was created from LIDAR point cloud data from a mapping car. In some aspects, the labeled lane marking includes a dashed line created by superimposing a dashed line with dashes over LIDAR reflections that indicate painted dashed traffic line on a road surface. In some aspects, the labeled lane marking is based on a human-generated map.

According to some aspects, the method includes re-fitting the set of lane marking points to a line from the at least one labeled lane marking via the point-to-line solver. For example, the mapping and localization stack 114 illustrated in FIG. 1 may re-fit the set of lane mark points to a line from the at least one labeled lane marking via the point-to-line solver.

According to some aspects, the method includes filtering the detected set of lane marking points to eliminate points from the set of lane marking points when they deviate from other points in the detected set of lane marking points by greater than a threshold. For example, the mapping and localization stack 114 illustrated in FIG. 1 may filter the detected set of lane mark points to eliminate points from the set of lane mark points when they deviate from other points in the detected set of lane mark points by greater than a threshold.

According to some aspects, the method includes solving for a covariance of the fitting by the point-to-line solver as a representation of an error of the localization of the autonomous vehicle to the location illustrated in the stored LIDAR map. For example, the mapping and localization stack 114 illustrated in FIG. 1 may solve for a covariance of the fitting by the point-to-line solver as a representation of an error of the localization of the autonomous vehicle to the location illustrated in the stored LIDAR map.

According to some aspects, the method includes transforming the solved two by two covariance matrix to a three by three global matrix that includes a longitudinal element, a latitudinal element, and a yaw element. For example, the mapping and localization stack 114 illustrated in FIG. 1 may transform the solved two by two covariance matrix to a three by three global matrix that includes a longitudinal element, a latitudinal element, and a yaw element.

According to some aspects, the method includes determining whether the covariance is below a threshold. For example, the mapping and localization stack 114 illustrated in FIG. 1 may determine whether the covariance is below a threshold. According to some aspects, the method includes receiving an output from at least one other localization scheme. For example, the mapping and localization stack 114 illustrated in FIG. 1 may receive an output from at least one other localization scheme.

According to some aspects, the method includes determining a best match between the generated fitting output and results of the at least one other localization scheme based on the covariance and calculated error measurements for the respective at least one other localization scheme. For example, the mapping and localization stack 114 illustrated in FIG. 1 may determine a best match between the generated fitting output and results of the at least one other localization scheme based on the covariance and calculated error measurements for the respective at least one other localization scheme. According to some aspects, the method includes sending the best match to a planner stack. For example, the mapping and localization stack 114 illustrated in FIG. 1 may send the best match to the planner stack 118.

Figure 6:
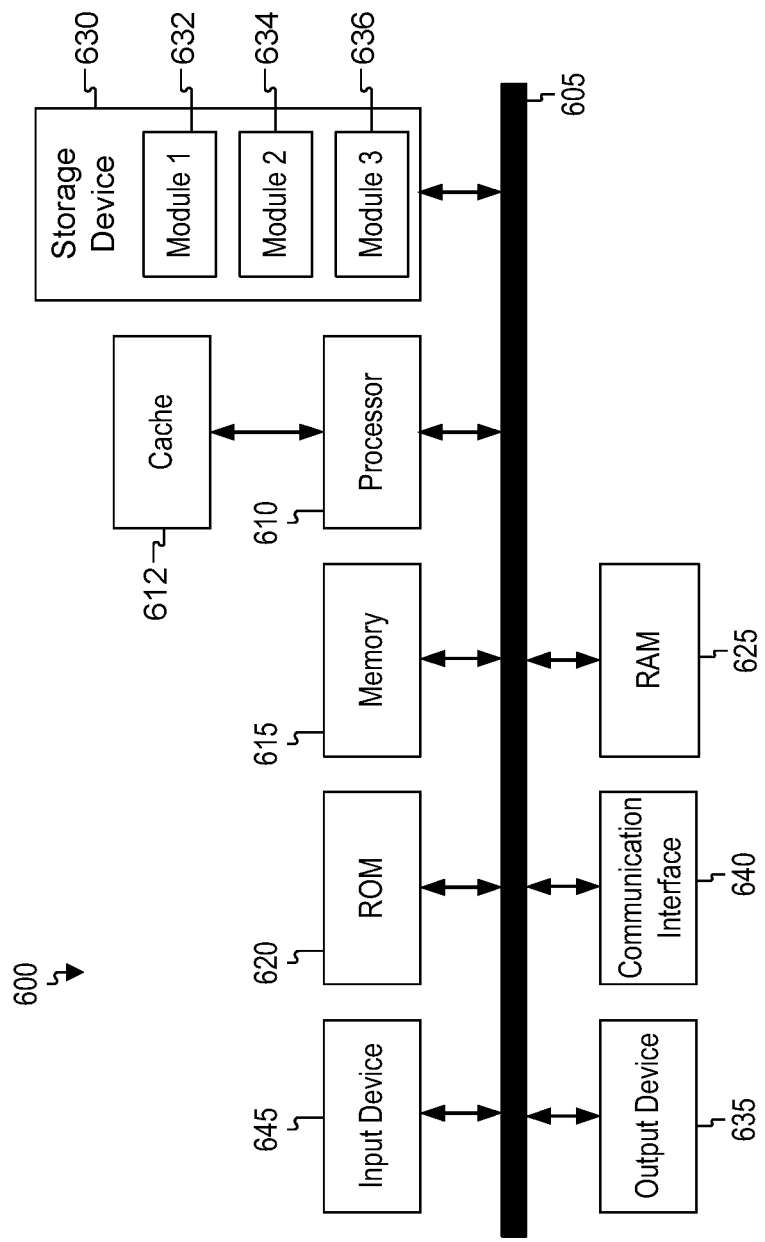
FIG. 6 shows an example system for implementing certain aspects of the present technology.

FIG. 6 shows an example of computing system 600, which can be, for example, any computing device making up the local computer device 110, the AV 102, and/or the data center 150, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, such as read-only memory (ROM) 620 and random access memory (RAM) 625 to processor 610. Computing system 600 can include a cache of high-speed memory 612 connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement, and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Illustrative examples of the disclosure include:

Aspect 1: A method for localizing an autonomous vehicle to a location in a stored LIDAR map relative to lane markings labeled in the stored LIDAR map, the method comprising: detecting a set of lane marking points by a sensor of an autonomous vehicle from a location; loading a map tile of the stored LIDAR map including at least one labeled lane marking; fitting the set of lane marking points to a line from the at least one labeled lane marking via a point-to-line solver that locates the set of lane marking points to the line, with a minimized longitudinal variable; and localizing the autonomous vehicle to the location on the stored LIDAR map based on the fitting by the point-to-line solver.

Aspect 2: The method of Aspect 1, wherein the lane marking labeled in the stored LIDAR map is a dashed lane boundary, which is represented in the stored LIDAR map as a solid line with a label indicating that the lane boundary is a dash line.

Aspect 3: The method of any of Aspects 1 to 2, wherein the lane marking labeled in the stored LIDAR map is a solid lane boundary, which is represented in the stored LIDAR map as a solid line with a label indicating that the lane boundary is a solid line.

Aspect 4: The method of any of Aspects 1 to 3, wherein the lane marking labeled in the stored LIDAR map is a double lane boundary, which is represented in the stored LIDAR map as a solid line with a label indicating that the lane boundary is a double line.

Aspect 5: The method of any of Aspects 1 to 4, wherein the lane marking labeled in the stored LIDAR map is an unmarked lane boundary, which is represented in the stored LIDAR map as a solid line with a label indicating that the lane boundary is unmarked.

Aspect 6: The method of any of Aspects 1 to 5, further comprising: determining whether the stored LIDAR map includes at least one visible lane marking near the autonomous vehicle; and failing the method for localizing the autonomous vehicle to a location in a stored LIDAR map when the lane boundary is an unmarked lane boundary.

Aspect 7: The method of any of Aspects 1 to 6, wherein the loading the map tile of the stored LIDAR map further comprises: loading a first map tile of the stored LIDAR map for a section of the stored LIDAR map that is behind the autonomous vehicle; loading a second map tile of the stored LIDAR map for a section of the stored LIDAR map on which the autonomous vehicle is located; loading a third map tile of the stored LIDAR map for a section of the stored LIDAR map that is in front of the autonomous vehicle; and generating a rolling map from the first map tile, the second map tile, and the third map tile, wherein the rolling map is dynamic whereby the first map tile is replaced by the second map tile, and the second map tile is replaced by the third map tile, and a new map tile is adding in place of the third map tile as the autonomous vehicle progresses forward.

Aspect 8: The method of any of Aspects 1 to 7, wherein the minimized longitudinal variable is a weak constant.

Aspect 9: The method of any of Aspects 1 to 8, wherein the minimized longitudinal variable is set to zero.

Aspect 10: The method of any of Aspects 1 to 9, wherein the point-to-line solver utilizes variables consisting essentially of a rotational variable and a latitudinal translation variable for each point.

Aspect 11: The method of any of Aspects 1 to 10, further comprising: re-fitting the set of lane marking points to a line from the at least one labeled lane marking via the point-to-line solver, wherein the re-fitting comprises: filtering the detected set of lane marking points to eliminate points from the set of lane marking points when they deviate from other points in the detected set of lane marking points by greater than a threshold.

Aspect 12: The method of any of Aspects 1 to 11, further comprising: solving for a covariance of the fitting by the point-to-line solver as a representation of an error of the localization of the autonomous vehicle to the location illustrated in the stored LIDAR map.

Aspect 13: The method of any of Aspects 1 to 12, further comprising: transforming the solved two by two covariance matrix to a three by three global matrix that includes a longitudinal element, a latitudinal element, and a yaw element.

Aspect 14: The method of any of Aspects 1 to 13, further comprising: determining whether the covariance is below a threshold.

Aspect 15: The method of any of Aspects 1 to 14, further comprising: receiving an output from at least one other localization scheme; determining a best match between the generated fitting output and results of the at least one other localization scheme based on the covariance and calculated error measurements for the respective at least one other localization scheme; and sending the best match to a planner stack.

Aspect 16: The method of any of Aspects 1 to 15, wherein the map tile of the stored LIDAR map was created from LIDAR point cloud data from a mapping car, and the labeled lane marking includes a dashed line created by superimposing a dashed line with dashes over LIDAR reflections that indicate painted dashed traffic line on a road surface.

Aspect 17: The method of any of Aspects 1 to 16, where the labeled lane marking is based on a human-generated map.

Aspect 18: A system for localizing an autonomous vehicle to a location in a stored LIDAR map relative to lane markings labeled in the stored LIDAR map, comprising: a storage configured to store instructions; and a processor configured to execute the instructions and cause the processor to: detect a set of lane marking points by a sensor of an autonomous vehicle from a location; load a map tile of the stored LIDAR map including at least one labeled lane marking; fit the set of lane marking points to a line from the at least one labeled lane marking via a point-to-line solver that locates the set of lane marking points to the line without a minimized longitudinal variable; and localize the autonomous vehicle to the location on the stored LIDAR map based on the fitting by the point-to-line solver.

Aspect 19: A non-transitory computer-readable medium comprising instructions, the instructions, when executed by a computing system, cause the computing system to: detect a set of lane marking points by a sensor of an autonomous vehicle from a location; load a map tile of a stored LIDAR map including at least one labeled lane marking; fit the set of lane marking points to a line from the at least one labeled lane marking via a point-to-line solver that locates the set of lane marking points to the line and with an output consisting of two variables; and localize the autonomous vehicle to the location on the stored LIDAR map based on the fitting by the point-to-line solver.

Aspect 20: The non-transitory computer-readable medium of Aspect 19, wherein the two variables include a yaw variable and a latitudinal variable.

Aspect 21: A system for localizing an autonomous vehicle to a location in a stored LIDAR map relative to lane markings labeled in the stored LIDAR map, comprising: a storage configured to store instructions; a processor configured to execute the instructions and cause the processor to: detect a set of lane mark points by a sensor of an autonomous vehicle from a location, load a map tile of the stored LIDAR map including at least one labeled lane marking, fit the set of lane mark points to a line from the at least one labeled lane marking via a point-to-line solver that locates the set of lane mark points to the line, without a longitudinal variable, and localize the autonomous vehicle to the location on the stored LIDAR map based on the fitting by the point-to-line solver.

Aspect 22: The system of Aspect 21, wherein the lane marking labeled in the stored LIDAR map is a dashed lane boundary, which is represented in the stored LIDAR map as a solid line with a label indicating that the lane boundary is a dash line.

Aspect 23: The system of any of Aspects 21 to 22, wherein the lane marking labeled in the stored LIDAR map is a solid lane boundary, which is represented in the stored LIDAR map as a solid line with a label indicating that the lane boundary is a solid line.

Aspect 24: The system of any of Aspects 21 to 23, wherein the lane marking labeled in the stored LIDAR map is a double lane boundary, which is represented in the stored LIDAR map as a solid line with a label indicating that the lane boundary is a double line.

Aspect 25: The system of any of Aspects 21 to 24, wherein the lane marking labeled in the stored LIDAR map is an unmarked lane boundary, which is represented in the stored LIDAR map as a solid line with a label indicating that the lane boundary is unmarked.

Aspect 26: The system of any of Aspects 21 to 25, wherein the processor is configured to execute the instructions and cause the processor to: determine whether the stored LIDAR map includes at least one visible lane mark near the autonomous vehicle; and fail the method for localizing the autonomous vehicle to a location in a stored LIDAR map when the lane boundary is an unmarked lane boundary.

Aspect 27: The system of any of Aspects 21 to 26, wherein the processor is configured to execute the instructions and cause the processor to: load a first map tile of the stored LIDAR map for a section of the stored LIDAR map that is behind the autonomous vehicle; load a second map tile of the stored LIDAR map for a section of the stored LIDAR map on which the autonomous vehicle is located; load a third map tile of the stored LIDAR map for a section of the stored LIDAR map that is in front of the autonomous vehicle; and generate a rolling map from the first map tile, the second map tile, and the third map tile, wherein the rolling map is dynamic whereby the first map tile is replaced by the second map tile, and the second map tile is replaced by the third map tile, and a new map tile is adding in place of the third map tile as the autonomous vehicle progresses forward.

Aspect 28: The system of any of Aspects 21 to 27, wherein the minimized longitudinal variable is a weak constant.

Aspect 29: The system of any of Aspects 21 to 28, wherein the minimized longitudinal variable is set to zero.

Aspect 30: The system of any of Aspects 21 to 29, wherein the point-to-line solver utilizes variables consisting essentially of a rotational variable and a latitudinal translation variable for each point.

Aspect 31: The system of any of Aspects 21 to 30, wherein the processor is configured to execute the instructions and cause the processor to: re-fit the set of lane mark points to a line from the at least one labeled lane marking via the point-to-line solver, wherein the re-fitting comprises filter the detected set of lane mark points to eliminate points from the set of lane mark points when they deviate from other points in the detected set of lane mark points by greater than a threshold.

Aspect 32: The system of any of Aspects 21 to 31, wherein the processor is configured to execute the instructions and cause the processor to: solve for a covariance of the fitting by the point-to-line solver as a representation of an error of the localization of the autonomous vehicle to the location illustrated in the stored LIDAR map.

Aspect 33: The system of any of Aspects 21 to 32, wherein the processor is configured to execute the instructions and cause the processor to: transform the solved two by two covariance matrix to a three by three global matrix that includes a longitudinal element, a latitudinal element, and a yaw element.

Aspect 34: The system of any of Aspects 21 to 33, wherein the processor is configured to execute the instructions and cause the processor to: determine whether the covariance is below a threshold.

Aspect 35: The system of any of Aspects 21 to 34, wherein the processor is configured to execute the instructions and cause the processor to: receive an output from at least one other localization scheme; determine a best match between the generated fitting output and results of the at least one other localization scheme based on the covariance and calculated error measurements for the respective at least one other localization scheme; and send the best match to a planner stack.

Aspect 36: The system of any of Aspects 21 to 35, wherein the map tile of the stored LIDAR map was created from LIDAR point cloud data from a mapping car, and the labeled lane marking includes a dashed line created by superimposing a dashed line with dashes over LIDAR reflections that indicate painted dashed traffic line on a road surface.

Aspect 37: The system of any of Aspects 21 to 36, wherein the labeled lane marking is based on a human-generated map.

Aspect 38: A non-transitory computer-readable medium comprising instructions, the instructions, when executed by a computing system, cause the computing system to: detect a set of lane mark points by a sensor of an autonomous vehicle from a location; load a map tile of the stored LIDAR map including at least one labeled lane marking; fit the set of lane mark points to a line from the at least one labeled lane marking via a point-to-line solver that locates the set of lane mark points to the line, excluding a longitudinal variable; and localize the autonomous vehicle to the location on the stored LIDAR map based on the fitting by the point-to-line solver.

Aspect 39: The non-transitory computer-readable medium of Aspect 38, the lane marking labeled in the stored LIDAR map is a dashed lane boundary, which is represented in the stored LIDAR map as a solid line with a label indicating that the lane boundary is a dash line.

Aspect 40: The non-transitory computer-readable medium of any of Aspects 38 to 39, the lane marking labeled in the stored LIDAR map is a solid lane boundary, which is represented in the stored LIDAR map as a solid line with a label indicating that the lane boundary is a solid line.

Aspect 41: The non-transitory computer-readable medium of any of Aspects 38 to 40, the lane marking labeled in the stored LIDAR map is a double lane boundary, which is represented in the stored LIDAR map as a solid line with a label indicating that the lane boundary is a double line.

Aspect 42: The non-transitory computer-readable medium of any of Aspects 38 to 41, the lane marking labeled in the stored LIDAR map is an unmarked lane boundary, which is represented in the stored LIDAR map as a solid line with a label indicating that the lane boundary is unmarked.

Aspect 43: The non-transitory computer-readable medium of any of Aspects 38 to 42, wherein the non-transitory computer-readable medium further comprises instructions that, when executed by the computing system, cause the computing system to: determine whether the stored LIDAR map includes at least one visible lane mark near the autonomous vehicle; and fail the method for localizing the autonomous vehicle to a location in a stored LIDAR map when the lane boundary is an unmarked lane boundary.

Aspect 44: The non-transitory computer-readable medium of any of Aspects 38 to 43, wherein the non-transitory computer-readable medium further comprises instructions that, when executed by the computing system, cause the computing system to: load a first map tile of the stored LIDAR map for a section of the stored LIDAR map that is behind the autonomous vehicle; load a second map tile of the stored LIDAR map for a section of the stored LIDAR map on which the autonomous vehicle is located; load a third map tile of the stored LIDAR map for a section of the stored LIDAR map that is in front of the autonomous vehicle; and generate a rolling map from the first map tile, the second map tile, and the third map tile, wherein the rolling map is dynamic whereby the first map tile is replaced by the second map tile, and the second map tile is replaced by the third map tile, and a new map tile is adding in place of the third map tile as the autonomous vehicle progresses forward.

Aspect 45: The non-transitory computer-readable medium of any of Aspects 38 to 44, the minimized longitudinal variable is a weak constant.

Aspect 46: The non-transitory computer-readable medium of any of Aspects 38 to 45, the minimized longitudinal variable is set to zero.

Aspect 47: The non-transitory computer-readable medium of any of Aspects 38 to 46, the point-to-line solver utilizes variables consisting essentially of a rotational variable and a latitudinal translation variable for each point.

Aspect 48: The non-transitory computer-readable medium of any of Aspects 38 to 47, wherein the non-transitory computer-readable medium further comprises instructions that, when executed by the computing system, cause the computing system to: re-fit the set of lane mark points to a line from the at least one labeled lane marking via the point-to-line solver, wherein the re-fitting comprises: filter the detected set of lane mark points to eliminate points from the set of lane mark points when they deviate from other points in the detected set of lane mark points by greater than a threshold.

Aspect 49: The non-transitory computer-readable medium of any of Aspects 38 to 48, wherein the non-transitory computer-readable medium further comprises instructions that, when executed by the computing system, cause the computing system to: solve for a covariance of the fitting by the point-to-line solver as a representation of an error of the localization of the autonomous vehicle to the location illustrated in the stored LIDAR map.

Aspect 50: The non-transitory computer-readable medium of any of Aspects 38 to 49, wherein the non-transitory computer-readable medium further comprises instructions that, when executed by the computing system, cause the computing system to: transform the solved two by two covariance matrix to a three by three global matrix that includes a longitudinal element, a latitudinal element, and a yaw element.

Aspect 51: The non-transitory computer-readable medium of any of Aspects 38 to 50, wherein the non-transitory computer-readable medium further comprises instructions that, when executed by the computing system, cause the computing system to: determine whether the covariance is below a threshold.

Aspect 52: The non-transitory computer-readable medium of any of Aspects 38 to 51, wherein the non-transitory computer-readable medium further comprises instructions that, when executed by the computing system, cause the computing system to: receive an output from at least one other localization scheme; determine a best match between the generated fitting output and results of the at least one other localization scheme based on the covariance and calculated error measurements for the respective at least one other localization scheme; and send the best match to a planner stack.

Aspect 53: The non-transitory computer-readable medium of any of Aspects 38 to 52, the map tile of the stored LIDAR map was created from LIDAR point cloud data from a mapping car, and the labeled lane marking includes a dashed line created by superimposing a dashed line with dashes over LIDAR reflections that indicate painted dashed traffic line on a road surface.

Aspect 54: The non-transitory computer-readable medium of any of Aspects 38 to 53, the labeled lane marking is based on a human-generated map.

What is claimed is:

1. A method for localizing an autonomous vehicle to a location in a stored Light Detection and Ranging (LIDAR) map relative to lane markings labeled in the stored LIDAR map, the method comprising:
    detecting a set of lane marking points by a sensor of the autonomous vehicle at a location;
    loading a map tile of the stored LIDAR map including at least one labeled lane marking;
    fitting the set of lane marking points to a line from the at least one labeled lane marking using a point-to-line solver that locates the set of lane marking points to the line, with a minimized longitudinal variable; and
    localizing the autonomous vehicle to the location on the stored LIDAR map based on the fitting by the point-to-line solver.

2. The method of claim 1, wherein the loading the map tile of the stored LIDAR map further comprises:
    loading a first map tile of the stored LIDAR map for a section of the stored LIDAR map that is behind the autonomous vehicle;
    loading a second map tile of the stored LIDAR map for a section of the stored LIDAR map on which the autonomous vehicle is located;
    loading a third map tile of the stored LIDAR map for a section of the stored LIDAR map that is in front of the autonomous vehicle; and
    generating a rolling map from the first map tile, the second map tile, and the third map tile, wherein the rolling map is dynamic whereby the first map tile is replaced by the second map tile, and the second map tile is replaced by the third map tile, and a new map tile is adding in place of the third map tile as the autonomous vehicle progresses forward.

3. The method of claim 1, wherein the point-to-line solver utilizes variables consisting essentially of a rotational variable and a latitudinal translation variable for each point.

4. The method of claim 1, further comprising:
    re-fitting the set of lane marking points to a line from the at least one labeled lane marking via the point-to-line solver, wherein the re-fitting comprises:
    filtering the detected set of lane marking points to eliminate points from the set of lane marking points when they deviate from other points in the detected set of lane marking points by greater than a threshold.

5. The method of claim 1, further comprising:
    solving for a covariance of the fitting by the point-to-line solver as a representation of an error of the localization of the autonomous vehicle to the location illustrated in the stored LIDAR map.

6. The method of claim 5, further comprising:
    receiving an output from at least one other localization scheme;

determining a best match between the generated fitting output and results of the at least one other localization scheme based on the covariance and calculated error measurements for the respective at least one other localization scheme; and sending the best match to a planner stack.

7. A system for localizing an autonomous vehicle to a location in a stored Light Detection and Ranging (LIDAR) map relative to lane markings labeled in the stored LIDAR map, comprising:

a storage configured to store instructions;

a processor configured to execute the instructions and cause the processor to:

detect a set of lane mark points by a sensor of an autonomous vehicle from a location, load a map tile of the stored LIDAR map including at least one labeled lane marking, fit the set of lane mark points to a line from the at least one labeled lane marking via a point-to-line solver that locates the set of lane mark points to the line, without a longitudinal variable, and localize the autonomous vehicle to the location on the stored LIDAR map based on the fitting by the point-to-line solver.

8. The system of claim 7, wherein the lane marking labeled in the stored LIDAR map is an unmarked lane boundary, which is represented in the stored LIDAR map as a solid line with a label indicating that the lane boundary is unmarked.

9. The system of claim 8, wherein the processor is configured to execute the instructions and cause the processor to:

determine whether the stored LIDAR map includes at least one visible lane mark near the autonomous vehicle; and fail the method for localizing the autonomous vehicle to a location in a stored LIDAR map when the lane boundary is an unmarked lane boundary.

10. The system of claim 7, wherein the processor is configured to execute the instructions and cause the processor to:

load a first map tile of the stored LIDAR map for a section of the stored LIDAR map that is behind the autonomous vehicle;

load a second map tile of the stored LIDAR map for a section of the stored LIDAR map on which the autonomous vehicle is located;

load a third map tile of the stored LIDAR map for a section of the stored LIDAR map that is in front of the autonomous vehicle; and generate a rolling map from the first map tile, the second map tile, and the third map tile, wherein the rolling map is dynamic whereby the first map tile is replaced by the second map tile, and the second map tile is replaced by the third map tile, and a new map tile is adding in place of the third map tile as the autonomous vehicle progresses forward.

11. The system of claim 7, wherein the processor is configured to execute the instructions and cause the processor to:

re-fit the set of lane mark points to a line from the at least one labeled lane marking via the point-to-line solver, wherein the re-fitting comprises:

filter the detected set of lane mark points to eliminate points from the set of lane markpoints when they deviate from other points in the detected set of lane mark points by greater than a threshold.

12. The system of claim 7, wherein the processor is configured to execute the instructions and cause the processor to:

solve for a covariance of the fitting by the point-to-line solver as a representation of an error of the localization of the autonomous vehicle to the location illustrated in the stored LIDAR map.

13. A non-transitory computer-readable medium comprising instructions for localizing an autonomous vehicle to a location in a stored Light Detection and Ranging (LIDAR) map relative to lane markings labeled in the stored LIDAR map, the instructions, when executed by a computing system, cause the computing system to:

detect a set of lane mark points by a sensor of the autonomous vehicle from the location;

load a map tile of the stored LIDAR map including at least one labeled lane marking;

fit the set of lane mark points to a line from the at least one labeled lane marking via a point-to-line solver that locates the set of lane mark points to the line, excluding a longitudinal variable; and localize the autonomous vehicle to the location on the stored LIDAR map based on the fitting by the point-to-line solver.

14. The non-transitory computer-readable medium of claim 13, the lane marking labeled in the stored LIDAR map is a dashed lane boundary, which is represented in the stored LIDAR map as a solid line with a label indicating that the lane boundary is a dash line.

15. The non-transitory computer-readable medium of claim 13, the lane marking labeled in the stored LIDAR map is a solid lane boundary, which is represented in the stored LIDAR map as a solid line with a label indicating that the lane boundary is a solid line.

16. The non-transitory computer-readable medium of claim 13, the lane marking labeled in the stored LIDAR map is a double lane boundary, which is represented in the stored LIDAR map as a solid line with a label indicating that the lane boundary is a double line.

17. The non-transitory computer-readable medium of claim 13, wherein the non-transitory computer-readable medium further comprises instructions that, when executed by the computing system, cause the computing system to:

load a first map tile of the stored LIDAR map for a section of the stored LIDAR map that is behind the autonomous vehicle;

load a second map tile of the stored LIDAR map for a section of the stored LIDAR map on which the autonomous vehicle is located;

load a third map tile of the stored LIDAR map for a section of the stored LIDAR map that is in front of the autonomous vehicle; and generate a rolling map from the first map tile, the second map tile, and the third map tile, wherein the rolling map is dynamic whereby the first map tile is replaced by the second map tile, and the second map tile is replaced by the third map tile, and a new map tile is adding in place of the third map tile as the autonomous vehicle progresses forward.

18. The non-transitory computer-readable medium of claim 13, wherein the non-transitory computer-readable medium further comprises instructions that, when executed by the computing system, cause the computing system to:

solve for a covariance of the fitting by the point-to-line solver as a representation of an error of the localization of the autonomous vehicle to the location illustrated in the stored LIDAR map.

19. The non-transitory computer-readable medium of claim 18, wherein the non-transitory computer-readable medium further comprises instructions that, when executed by the computing system, cause the computing system to:
- transform the solved two by two covariance matrix to a three by three global matrix that includes a longitudinal element, a latitudinal element, and a yaw element.

20. The non-transitory computer-readable medium of claim 13, the map tile of the stored LIDAR map was created from LIDAR point cloud data from a mapping car, and the labeled lane marking includes a dashed line created by superimposing a dashed line with dashes over LIDAR reflections that indicate painted dashed traffic line on a road surface.

* * * * *